United States Patent
Ramos

(10) Patent No.: US 9,041,525 B2
(45) Date of Patent: May 26, 2015

(54) LIGHT CONTROL SYSTEM

(71) Applicant: Caterpillar Paving Products Inc., Minneapolis, MN (US)

(72) Inventor: Igor S. Ramos, Minnetonka, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 326 days.

(21) Appl. No.: 13/652,763

(22) Filed: Oct. 16, 2012

(65) Prior Publication Data

US 2014/0104056 A1   Apr. 17, 2014

(51) Int. Cl.
*B60Q 1/52* (2006.01)
*B60Q 1/46* (2006.01)

(52) U.S. Cl.
CPC ... *B60Q 1/52* (2013.01); *B60Q 1/46* (2013.01)

(58) Field of Classification Search
CPC .......................... B60R 1/1207; F21Y 2101/02
USPC .................. 340/463, 464, 468, 471; 362/459, 362/487–507, 542
See application file for complete search history.

(56) References Cited

U.S. PATENT DOCUMENTS

| | | | |
|---|---|---|---|
| 5,872,511 A * | 2/1999 | Ohkuma | 340/471 |
| 6,023,221 A | 2/2000 | Michelotti | |
| 7,956,732 B2 | 6/2011 | Gumbel et al. | |
| 2005/0248442 A1* | 11/2005 | Wagner | 340/331 |
| 2006/0133099 A1 | 6/2006 | Thannikary | |
| 2009/0096601 A1* | 4/2009 | Gumbel et al. | 340/471 |
| 2010/0283598 A1* | 11/2010 | King et al. | 340/472 |
| 2011/0198995 A1* | 8/2011 | Salter et al. | 315/51 |

* cited by examiner

*Primary Examiner* — Brian Zimmerman
*Assistant Examiner* — Laura Nguyen
(74) *Attorney, Agent, or Firm* — Andrew A. Phillips

(57) ABSTRACT

A machine having a light control system is provided. The light control system includes a hazard light associated with the machine, a plurality of control locations provided on the machine, and a light control module provided at each of the plurality of control locations and communicably coupled to the hazard light. The light control module configured to receive an input signal from each of the plurality of control locations. The light control module is further configured to prioritize the input signal based on a time stamp associated with the input signal. The light control module is further configured to control an operation of the hazard light based, at least in part, on the prioritized input signal.

19 Claims, 4 Drawing Sheets

//LIGHT CONTROL SYSTEM

TECHNICAL FIELD

The present disclosure relates to a light control system for a machine, and more specifically to a light control system for controlling an operation of a hazard light associated with the machine.

BACKGROUND

Several types of lights are provided on a machine for a variety of purposes. Lights are provided for their lighting utility and have to conform to lighting regulations of the jurisdiction of their use. A typical machine may include, for example, headlights, turn indicators, brake lights, rear lights, beacon lights, and hazard lights. Usually hazard lights are not separately provided on the machine but function through other lights already provided on the machine. For example, the turn indicators indicates a direction of a turn the machine is about to make during normal operation of the machine. However, during an emergency situation, the turn indicators act as hazard lights instead of indicating the direction of the turn.

Hazard lights are provided on the machine to alert others operating in proximity to the machine of an abnormal dangerous, or potentially dangerous situation. For example, hazard lights may be activated if an operator or another person has been disabled. Hazard lights may also be activated on a disabled machine or a slow moving machine. Generally, an operator is in charge of manually controlling the operation, that is, activation and de-activation, of these lights. The operator activates the hazard lights by providing an input signal to the hazard lights. The input signal may be provided in a number of ways known in the art, for example, by pressing a hazard button provided on the machine. When the hazard lights are activated, the front and rear, left and right turn signals will flash in unison to alert others of the abnormal situation. Seeing the flash of the hazard lights others may take an appropriate action, such as slowing down, stopping, rendering assistance, or maintaining distance. With the advancement of technology and change in design of the machine, mode of operation of these lights may change. For example, it is quite possible and feasible, subject to the regulatory norms of a jurisdiction that hazard lights may be provided as separate lights from other lights provided on the machine. In this case, hazard lights may be used independently of the other lights.

Usually, the lights are operated by the operator of the machine from an operator station provided on the machine. In certain machines, there is a need for having more than one operator stations. For example, large machines such as asphalt pavers may be provided with two or more operator stations for providing a better view to the operator of the machine.

A machine operator operates the lights from only one of the operator stations. When the operator needs to control the operation of the lights, the operator may need to suspend an ongoing task and reach the operator station where a control function for the lights is provided. This is inconvenient and wastes time. Further, this may result in situations where the operator is not able to operate the lights in time and a mishap may result. And if the operator is unable to control the operation of the hazard lights in timely fashion after recognizing and emergency situation, the level of danger to the machine, machine's operator, and other operating in proximity to the machine rises significantly.

SUMMARY OF THE DISCLOSURE

In one aspect of the present disclosure, a machine comprising a light control system is provided. The system includes a hazard light, a plurality of control locations and a light control module. The light control module is provided at each of the plurality of control locations and is communicably coupled to the hazard light. The control module receives an input signal from each of the plurality of control locations. The light control module prioritizes the input signal based on a time stamp associated with the input signal. The light control module controls an operation of the hazard light based, at least in part, on the prioritized input signal.

In another aspect of the present disclosure, a light control system is provided. The system includes a hazard light, at least one other light, a plurality of control locations and a light control module. The light control module is provided at each of the plurality of control locations and is communicably coupled to the hazard light and the at least one other light. The control module receives an input signal from each of the plurality of control locations. The light control module prioritizes the input signal based on a time stamp. The light control module controls an operation of the hazard light based on the prioritized input signal.

In yet another aspect, a method for controlling an operation of a hazard light associated with a machine is provided. The method receives an input signal from each of a plurality of control locations provided on the machine. The method determines a timestamp associated with the input signal. The method prioritizes the input signal based on the determined timestamp. The method controls the operation of the hazard light based on the prioritized input signal.

Other features and aspects of present disclosure will be apparent from the following description and the accompanying drawings.

DETAILED DESCRIPTION

Figure 1:
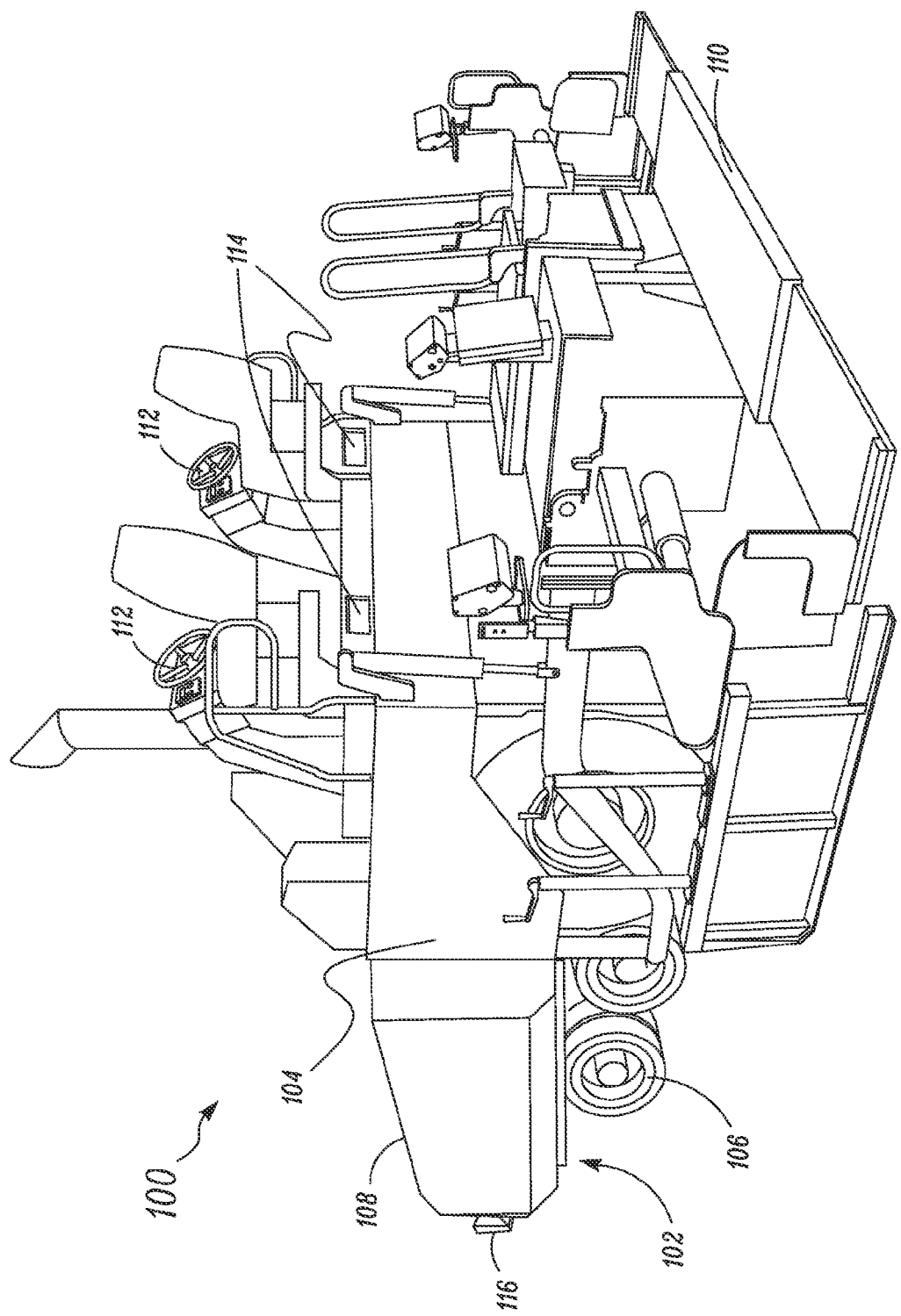
FIG. 1 is a diagrammatic view of an exemplary machine, according to one embodiment of the present disclosure.

FIG. 1 is an illustration of an exemplary machine 100 according to one embodiment of the present disclosure. The machine 100 may be a paving machine 102, such as an asphalt paver. Moreover, the machine 100 may also include other paving machines using any kind of paving material such as, but not limited to, concrete, loose aggregate materials such as crushed gravel, and the like. Further, the machine 100 may include any machine where there is a need for controlling the lights provided on the machine from each one of a plurality of operator stations of the machine.

Referring to FIG. 1, the paving machine 102 includes a tractor 104 having a power source, one or more traction devices 106, and a hopper 108 for containing paving material. The paving machine 102 also includes a screed 110. The screed 110 is attached to the tractor 104 by one or more tow arms. The screed 110 is towed behind the tractor 104 to spread and compact the paving material into a mat on a paving surface. The screed 110 includes one or more augers for spreading the paving material.

As shown in the accompanying figures, the paving machine 102 further includes a plurality of operator stations 112, a hazard light 114, and other lights 116. It may be noted here that hazard light 114 is not necessarily separate from the other lights 116 provided on the machine 100. The other lights 116 may act as hazard light 114 in an emergency situation. For example, during an emergency situation, the turn indicators act as hazard lights 114 instead of indicating the direction of the turn. The other light 116 may include one or more of the headlights, turn indicators, brake lights, rear lights, beacon lights, and the like. Each of the plurality of operator stations 112 can be considered as a control location 202 (see FIG. 2) for controlling the operation of the hazard light 114 via a light control module 204. In one embodiment, each of the plurality of operator stations 112 contains control panels including for example, momentary switches, buttons, and the like as an input interface for the operator of the machine 100. It should be understood that the momentary switches are less expensive and have a longer life than the mechanical switches. Further, the momentary switches provide a modern look to the machine 100 which is demanded by customers.

These implementations are merely on an exemplary basis and may include the input interface capable of supporting direct and remote operator inputs. The plurality of operator stations 112 may additionally include other controls for performing varied other operations on the machine 100. The light control module 204 is configured to control the operation of the hazard light 114 based on inputs received from each of the plurality of operator stations 112. The detailed working of the light control module will be discussed in connection with FIG. 2.

It should be noted that although only two operator stations 112 have been shown in the FIG. 1, the scope of the present disclosure is not limited to the presence of the two operator stations 112. The disclosure may be utilized on any machine 100 having two or more operator stations 112. Further, although only two hazard lights 114 are shown in the accompanying figures, it will be clear to a person of ordinary skill in the art that more than two hazard lights 114 may be provided on the machine 100. Also, parameters related to the hazard lights 114 such as location of the hazard lights 114 on the machine 100 may vary. For example, the hazard lights 114 may be provided at one or more of a front location, a back location, one or more side locations, and a top location as per need. Further, the hazard lights 114 may be included in or embodied as one or more of the headlights, turn indicators, brake lights, rear lights, beacon lights, and the like of the machine 100.

Figure 2:
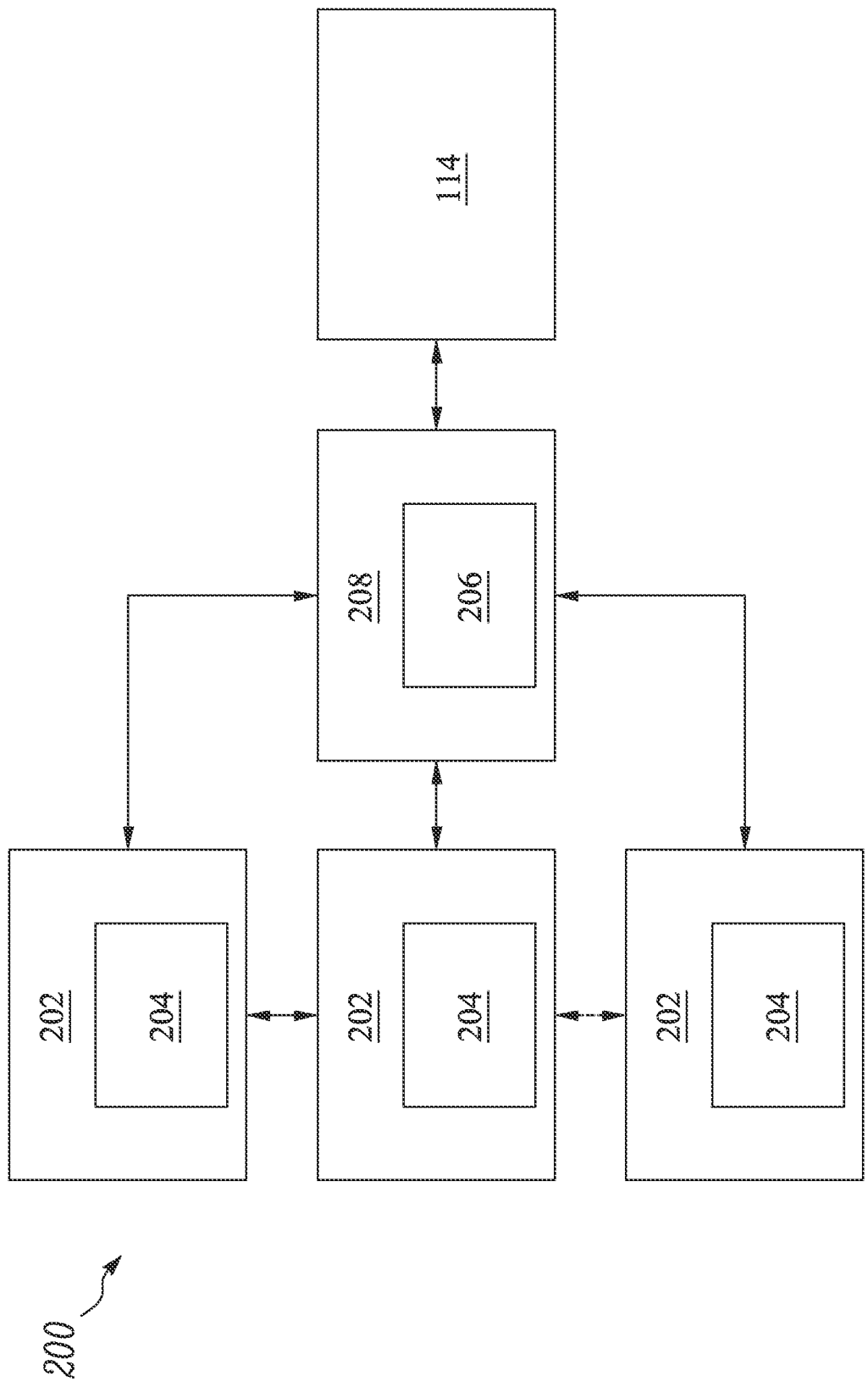
FIG. 2 is a block diagram of a system located on the machine shown in FIG. 1.

FIG. 2 is a block diagram of a system 200 onboard the machine 100. The system 200 is configured to control the operation of the hazard light 114 according to one embodiment of the present disclosure. The system 200 includes the plurality of control locations 202, such that each of the plurality of control locations 202 may be associated with a corresponding operator station 112. The system 200 further includes the plurality of light control modules 204, wherein each of the plurality of light control modules 204 is associated with a corresponding control location 202. Further, each of the plurality of light control modules 204 is communicably coupled to the hazard light 114 either directly or indirectly.

Referring to FIG. 2, each of the plurality of light control modules 204 is communicably coupled indirectly to the hazard light 114 via a light controller 208. The light controller 208 is configured to control the working of the other lights 116 located on the machine 100. A person of ordinary skill in the art will appreciate that the light controller 208 may include circuitry known in the art for operating the other lights 116 on the machine 100.

Referring to FIG. 2, the light controller 208 includes a flasher module 206. The flasher module 206 generates a flash rate for the hazard light 114. The flash rate generated by the flasher module 206 is provided as an input signal to the light controller 208. The light controller 208 can control the flash rate of the hazard light 114 based on the flash rate generated by the flasher module 206. In one embodiment, the flasher module 206 may be provided as a separate module communicably coupled to the light controller 208 and/or the plurality of light control modules 204. It should be noted that various modules of the systems may communicate with one another using various methods such as wired and wireless communications. Further, one module may communicate with another module either directly or indirectly via a third module.

Additionally, each of the plurality of control locations 202 are communicably coupled to one another. The communication may be via the plurality of light control modules 204. For example, each of the light control module 204 present in a given control location 202 may receive input signals from each of the remaining control locations 202 present on the machine 100. In one embodiment of the disclosure, the light control modules 204 are communicably coupled to the hazard light 114 via a data link interface, such as a controller area network (CAN) bus. Further, the light control modules 204 may also be communicably coupled to one another via the CAN bus. The light control modules 204 can also communicate with one another and the hazard light 114 via wireless communication.

The system 200 may further include a display unit (not shown in the accompanying figures) provided at each of the plurality of control locations 202. The display unit may be communicably coupled to the light control module 204 of the given operator station 112. Optionally, the display unit may be communicably coupled to the flasher module 206. The display unit is configured to indicate a status of one or more input and/or output signals of the plurality of control locations 202. The display unit may further include one or more indicators to notify the operator of an event associated with the hazard light 114. For example, the operator may be notified of an activation or de-activation of the hazard light 114.

It should be noted that the flasher module 206 may also provide a flash rate for the one or more indicators of the display unit. For example, a first flash rate may be provided for the hazard light 114 and a second flash rate for the one or more indicators. The light controller 208 is configured to flash the hazard light 114 and the one or more indicators based on the first flash rate and the second flash rate. In one embodiment, the light controller module 208 may be configured to flash the hazard light 114 and the one or more indicators at the same frequency and duration.

Figure 3:
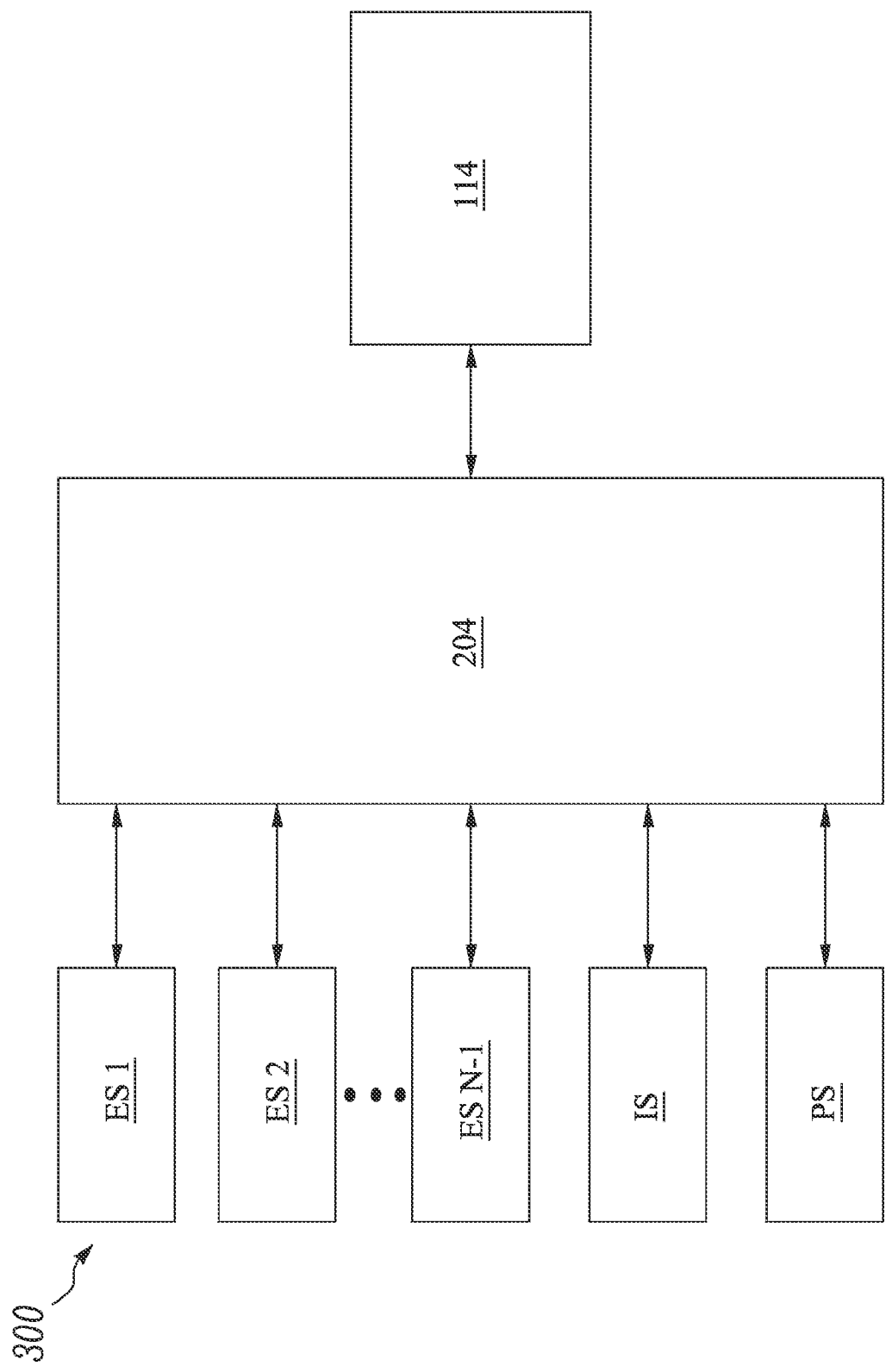
FIG. 3 is a block diagram of a light control module.

FIG. 3 is a block diagram of a system 300 including the light control module 204 directly coupled to the hazard light 114 according to the present disclosure. As shown, the light control module 204 is also communicably coupled to the one or more switches and/or buttons present at the operator station 112. It should be noted that in this embodiment, the flasher module 206 of FIG. 2 is provided within the light control module 204. Each of the light control modules 204 may include one flasher module 206. Alternatively, the flasher module 206 may be a separate module communicably coupled to each of the light control modules 204.

Referring to FIG. 3, the one or more switches are depicted as one or more external switches (ES), one or more internal switches (IS), and a power key switch (PS). It should be noted that designation of the one or more switches as IS or ES is indicative of the location or positioning of the given switch with respect to a given control location 202. For example, if the plurality of the control locations 202 includes N control locations 202 (N being a natural number greater than 1) then, in such a situation there may be the internal switch IS associated with the given control location 202. Further, there are N−1 external switches ES, corresponding to each of the other N−1 control locations 202 extrinsic to the given control location 202.

The power key switch PS, the internal switch IS, and the external switches ES are provided on the control panel (not shown in figures). In one embodiment, the one or more switches may include momentary switches. In another embodiment, the one or more switches may be metal dome momentary switches. In yet another embodiment, the one or more switches may be membrane switches. Moreover, the light control module 204 is configured to control the operation of the hazard light 114 when the power key switch PS is in an on or off condition. The light control module 204 receives one or more input signals corresponding to each of the one or more switches including the external switches ES, the internal switches IS and optionally the power key switch PS.

In the present disclosure, the operation of the hazard light 114 is controlled by the light control module 204 based on the input signals received from each of the plurality of operator stations 112. For example, the hazard light 114 may be activated from a given operator station of the plurality of operator stations 112, and subsequently, deactivated from the given operator station. It should be noted that at any instant of time, the activation of the hazard light 114 is based on the input signal associated with any one of the plurality of control locations 202.

Also, the light control module 204 facilitates in the activation of the hazard light 114 from the given control location 202 and de-activation from the same or different control location 202. Hence, in a situation in which the hazard light 114 is activated on the input signal of the given control location 202, and also receives other input signals associated with any of the remaining control locations 202; the light control module 204 may be configured to prioritize the input signals. It should be noted the prioritization may be based on a variety of methods. One exemplary method is described herein and does not limit the scope of the present disclosure.

The light control module 204 is configured to determine a timestamp associated with each of the one or more input signals. Further, the light control module 204 is configured to prioritize the one or more input signals based on the timestamp. The operation of the hazard light 114 is controlled based on the prioritized signal. For example, in case the hazard light is already activated, the input signal having the most recent timestamp is given the highest priority. Accordingly, in one embodiment, the light control module 204 deactivates the hazard light 114 and re-activate the hazard light 114 based on the prioritized input signal. Optionally, the light control module 204 may be configured to pulse an output to indicate temporary deactivation of the hazard light 114. A person of ordinary skill in the art will appreciate that controlling of the hazard light 114 by the light control module 204 may include the activation or deactivation of the hazard light 114, as the case may be. Further, the light control module 204 may be configured to control the other lights 116 on the machine 100 in a similar manner.

The light control module 204 may embody a single microprocessor or multiple microprocessors that include a means for receiving input from the plurality of control locations 202 and providing output to the hazard light 114 of the machine 100. Numerous commercially available microprocessors may be configured to perform the functions of the light control module 204. It should be appreciated that the light control module 204 may be a general machine microprocessor capable of controlling other machine functions. A person of ordinary skill in the art will appreciate that the light control module 204 may additionally include other components and may also perform other functionality not described herein. The method for controlling the hazard light 114 will be described in detail in connection with FIG. 4.

INDUSTRIAL APPLICABILITY

The machine 100 includes the plurality of operator stations 112 for a variety of reasons such as for providing a better view to an operator of the machine 100. Further, the plurality of operator stations 112 may include one or more ground level operator stations 112. The one or more ground level operator stations 112 may provide some key functions such as an Emergency Stop switch to kill the engine. For example, it may be required to control the hazard light 114 from the one or more ground level operator stations 112. It is convenient to control the hazard light 114 from the one or more ground level operator stations 112, in case the operator is at ground level. Otherwise the operator has to climb back into the machine 100 just to activate the hazard light 114. Current solutions include controlling the hazard light 114 only from a single operator station. The present disclosure discloses a light control system for the machine 100 to enable the operator to control lights, including the hazard light 114 and other lights 116 provided on the machine 100 in an efficient manner. The system helps avoid further mishaps when an emergency situation has occurred. Further, use of metal dome switches in the system makes it simple, modern looking and reduces the costs. The system further reduces the cost by utilizing a single console part number for each of the plurality of operator stations 112 instead of having multiple unique parts, one with and one without light control modules 204. Further, as the operator may operate the machine 100 from any of the plurality of operator stations 112, it is advantageous to have same controls at each of the plurality of operator stations 112.

In the present disclosure, as described above, the light control module 204 present at each of the control locations 202 is configured to activate or deactivate the hazard light 114. Further, the system 200 of the present disclosure will draw zero or minimal current when the hazard light 114 is deactivated.

Although, the disclosure has been described with respect to the hazard light 114, it should be understood that all lights which may be provided on the machine 100 can be controlled in a similar fashion without departing from the spirit and scope of the disclosure.

Figure 4:
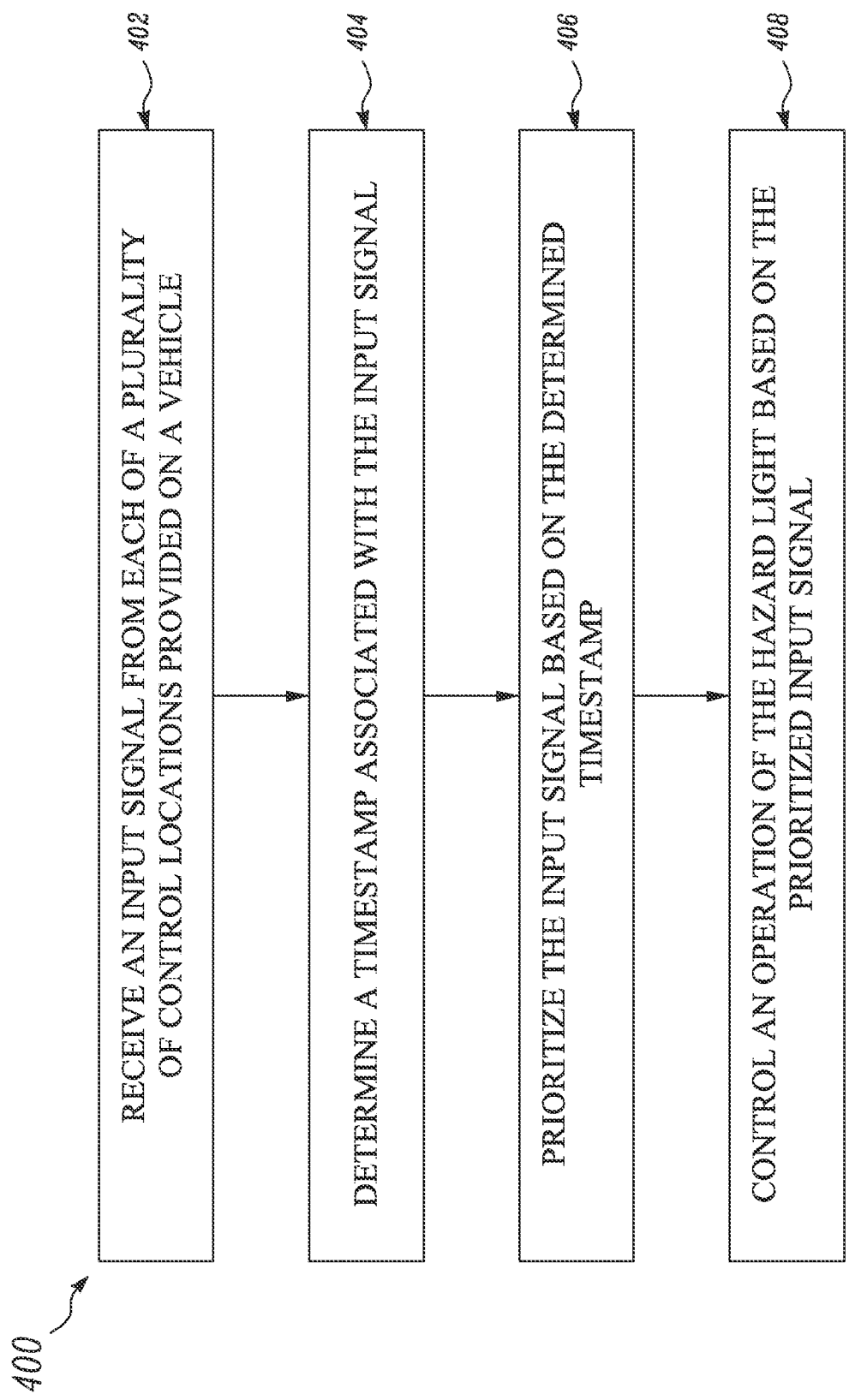
FIG. 4 is a flowchart of a method for controlling an operation of a hazard light associated with the machine.

FIG. 4 illustrates a method 400 for controlling the hazard light 114 from each of the plurality of operator stations 112. At step 402, one or more input signals from each of the plurality of control locations 202 are received. The one or more input signals are provided through buttons or switches provided at the plurality of control locations 202. For example, each of the plurality of control locations 202 may include an input interface where buttons and/or switches including a hazard button are provided. The hazard button controls activation and deactivation of the hazard light 114. The hazard button may be a momentary metal dome switch, which activates the hazard lights 114 on a first push and deactivates the hazard light 114 on a subsequent push. The hazard button located at a control location 202 from which the operator controls the hazard light 114 is designated as the internal switch IS and other hazard buttons located at other control locations 202 are designated as the external switches ES. In other words, the designation of the switches as the internal switch IS and the external switches ES varies with the presence of the operator at a control location 202. The one or more input signals include signals received from the given control location 202 via the internal switch IS; and also from the remaining control locations 202 present on the machine 100 via the external switches ES (1 to N−1). The one or more input signals may be statuses of communication paths from the plurality of light control modules 204 to the hazard light 114. For example, the voltage levels of the communication paths from other light control modules 204 may be received as the one or more input signals at the given control location 202.

One or more input signals may also be received from the flasher module 206. The one or more input signals from the flasher module 206 provides flash rates. The one or more input signals may additionally include a signal indicating the status of the power key switch PS. The status of the power key switch is taken into account to select a method from alternative methods of controlling the hazard light 114. The system can control the hazard light 114 both when the power key switch is on and off, with slightly different methods. For example, when the power key switch has an off status, alternative power sources and/or communication paths may be used to control the hazard light 114.

At step 404, a timestamp is determined for each of the received input signal. The light control module 204 determines the timestamp associated with each of the one or more input signals. The timestamp may include a time of an operation performed from a control location 202. The timestamp may be generated, stored, transmitted in a variety of ways known in the art. Further, the timestamp may be indicated through a dual state mechanism, such as digital on and off states. In one embodiment, the timestamp may be generated by the light control module 204. In another embodiment, the timestamp is generated by a separate module and provided to the light control module 204. A person of ordinary skill in the art will appreciate that the timestamp is a known method of keeping track of the order of occurrence or generation of the input signals. Typically, a cost-effective solution involving the use of minimum additional circuitry may be utilized to note the timestamp associated with the input signal.

At step 406, each of the received one or more input signals is prioritized based on the determined timestamp. The prioritized signal determines which control location 202 may control the activation or deactivation of the hazard light 114. In one example, the input signal having the most recent timestamp may be given a highest priority. Other mechanisms and/or algorithms may also be used for prioritizing the one or more input signals without any limitation.

At step 408, the operation of the hazard light 114 is controlled based on the prioritized input signal. The hazard light 114 is activated or deactivated based on the prioritized input signal. The priority of the one or more signals is determined to decide which control location 202 has the instantaneous control of the hazard light 114. In one case, prioritization of the one or more signals mean that a latest signal should control the hazard light 114. However, in another case, prioritization may be based on some other factors such as voltage or current levels of the one or more signals. To further illustrate, suppose, the plurality of control locations 202 comprises of a first and a second control locations 202. The operator may activate the hazard light 114 from the first control location 202. The operator may go to the second control location 202 for operating the machine 100. It may be required to deactivate the hazard light 114 from the second control location 202. The operator will push the hazard button at the second control location 202 to deactivate the hazard light 114. The light control module 204 at the second control location 202 will check the status of signals from the first control location 202 and/or the status of the signal from power key switch PS. In one case status can be accessed through the time stamps which identify different signals. Based on the status and the time stamp of the one or more signals the light control module 204 at the second control location 202 can deactivate the hazard light 114.

As pointed out earlier, although, various embodiments of the disclosure described herein are with respect to the hazard light 114, it will be appreciated by a person of ordinary skill in the art that the disclosure is applicable to other lights on the machine 100, such as the other lights 116.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A machine having a light control system, the light control system comprising:
   a hazard light associated with the machine;
   a plurality of control locations provided on the machine; and
   a light control module provided at each of the plurality of control locations and communicably coupled to the hazard light, the light control module configured to:
      receive an input signal from the each of the plurality of control locations;
      determine a timestamp associated with the input signal;
      prioritize the input signal based on the time stamp associated wiht the input signal; and
      control an operation of the hazard light based, at least in part, on the prioritized input signal.

2. The machine of claim 1, wherein the each of the plurality of control locations is associated with an operator station of the machine.

3. The machine of claim 1, wherein the light control module is configured to receive a status of a power key switch of the machine.

4. The machine of claim 3, wherein the light control module is configured to control the operation of the hazard light during an off status of the power key switch.

5. The machine of claim 1 further comprising a display unit having an indicator.

6. The machine of claim 5 further comprising a flasher module communicably coupled to the light control module and the display unit, the flasher module configured to provide a first flash rate for the hazard light and a second flash rate for the indicator.

7. The machine of claim 6, wherein the light control module is configured to flash the hazard light and the indicator based on at least one of the first and the second flash rates.

8. The machine of claim 1, wherein each of the plurality of control locations includes a momentary switch.

9. The machine of claim 1, wherein the machine is an asphalt paver.

10. A light control system comprising:
   a hazard light associated with a machine;
   at least one other light associated with the machine;
   a plurality of control locations provided on the machine; and
   a light control module provided at each of the plurality of control locations and communicably coupled to the hazard light and the at least one other light, the light control module configured to:
      receive an input signal from the each of the plurality of control locations;
      determine a timestamp associated with the input signal;
      prioritize the input signal based on the timestamp associated with the input signal; and
      control an operation of the at least one of the hazard light and the at least one other light based on the prioritized input signal.

11. The light control system of claim 10, wherein the each of the plurality of control locations is associated with an operator station of the machine.

12. The light control system of claim 10, wherein the light control module is configured to receive a status of a power key switch of the machine.

13. The light control system of claim 12, wherein the light control module is configured to control the operation of the hazard light during an off status of the power key switch.

14. The light control system of claim 10 further comprising a display unit having an indicator.

15. The light control system of claim 14 further comprising a flasher module communicably coupled to the light control module and the display unit, the flasher module configured to provide a first flash rate for the hazard light and a second flash rate for the indicator.

16. A method for operating a hazard light associated with a machine, the method comprising:
   receiving, by a microprocessor, an input signal from each of a plurality of control locations provided on the machine;
   determining, by a microprocessor, a timestamp associated with the input signal;
   prioritizing, by a microprocessor, the input signal based on the determined timestamp; and
   controlling, by a microprocessor, an operation of the hazard light based on the prioritized input signal.

17. The method of claim 16, wherein the controlling the operation of the hazard light comprises at least one of an activating and a deactivating of the hazard light.

18. The method of claim 17, wherein the activating of the hazard light is for a pre-determined duration of time.

19. The method of claim 16 further comprising receiving a status of a power key switch associated with the machine.

* * * * *